United States Patent
Zhu et al.

(10) Patent No.: US 11,313,272 B2
(45) Date of Patent: Apr. 26, 2022

(54) CYLINDER STRUCTURE OF ROTARY PISTON INTERNAL COMBUSTION ENGINE

(71) Applicant: Jiangxi University of Science and Technology, Jiangxi (CN)

(72) Inventors: Hua Zhu, Jiangxi (CN); Xiukun Lai, Jiangxi (CN); Yangwen Ge, Jiangxi (CN); Jinbao Huang, Jiangxi (CN)

(73) Assignee: Jiangxi University of Science and Technology, Jiangxi (CN)

( * ) Notice: Subject to any disclaimer, the term of this patent is extended or adjusted under 35 U.S.C. 154(b) by 0 days.

(21) Appl. No.: 17/136,324

(22) Filed: Dec. 29, 2020

(65) Prior Publication Data

US 2021/0340901 A1  Nov. 4, 2021

(30) Foreign Application Priority Data

Apr. 29, 2020 (CN) .......................... 202010358751.6

(51) Int. Cl.
*F02B 53/08* (2006.01)
*F02B 33/36* (2006.01)

(52) U.S. Cl.
CPC .............. *F02B 53/08* (2013.01); *F02B 33/36* (2013.01)

(58) Field of Classification Search
CPC .......... F02B 53/08; F02B 53/00; F02B 53/04; F02B 53/02; F02B 33/36
USPC .......................... 123/206, 235, 236, 238, 241
See application file for complete search history.

(56) References Cited

U.S. PATENT DOCUMENTS

| | | | | |
|---|---|---|---|---|
| 1,267,157 A | * | 5/1918 | Zabriskie | F02B 53/00 123/236 |
| 1,605,912 A | * | 11/1926 | Barker | F01C 1/44 123/236 |
| 1,919,355 A | * | 7/1933 | Bancroft | F01C 1/3442 123/204 |
| 2,075,561 A | * | 3/1937 | Wellensiek | F01C 1/3442 123/235 |
| 2,682,258 A | * | 6/1954 | Udelman | F01C 11/004 123/235 |
| 3,411,488 A | * | 11/1968 | Kratina | F02B 53/00 123/235 |
| 3,716,033 A | * | 2/1973 | Lepine | F02B 53/00 123/235 |
| 3,726,259 A | * | 4/1973 | Graves | F02B 53/00 123/236 |
| 3,918,413 A | * | 11/1975 | Eiermann | F02B 53/08 123/203 |

(Continued)

*Primary Examiner* — Shafiq Mian
(74) *Attorney, Agent, or Firm* — Edwin A. Sisson, Attorney at Law, LLC; Jeffrey J. Banyas

(57) ABSTRACT

A cylinder structure of a rotary piston internal combustion engine includes a rotating shaft, the two sides of the rotating shaft are installed on machine bases, front deflector rods and rear deflectors rod are fixed to the two outer ends of the rotating shaft respectively, the included angles between the front deflector rods and the rear deflector rods are 29 degrees, the front deflector rods at the two outer ends are arranged in the radial direction of the rotating shaft at 180 degrees, and the rear deflector rods at the two outer ends are arranged in the radial direction of the rotating shaft at 180 degrees, and a combustion device and a compression device are sequentially arranged between the two machine bases.

4 Claims, 4 Drawing Sheets

(56) References Cited

U.S. PATENT DOCUMENTS

| | | | | |
|---|---|---|---|---|
| 4,154,208 A | * | 5/1979 | Kunieda | F02B 53/02 |
| | | | | 123/236 |
| 4,572,121 A | * | 2/1986 | Chang | F02B 53/08 |
| | | | | 123/236 |
| 6,467,450 B1 | * | 10/2002 | Arce | F01C 1/3446 |
| | | | | 123/236 |
| 6,766,783 B1 | * | 7/2004 | Person | F02B 53/02 |
| | | | | 123/236 |
| 6,959,685 B2 | * | 11/2005 | Person | F02B 53/02 |
| | | | | 123/236 |
| 7,117,839 B2 | * | 10/2006 | Horstin | F02B 53/04 |
| | | | | 123/236 |
| 7,117,841 B2 | * | 10/2006 | Kernes | F02B 53/02 |
| | | | | 123/241 |
| 8,230,836 B2 | * | 7/2012 | Kamenov | F02B 53/08 |
| | | | | 123/241 |

* cited by examiner

CYLINDER STRUCTURE OF ROTARY PISTON INTERNAL COMBUSTION ENGINE

TECHNICAL FIELD

The present disclosure relates to improvement of a cylinder structure of an internal combustion engine, in particular to a cylinder structure of a rotary piston internal combustion engine, so that the energy conversion rate of the internal combustion engine is obviously improved.

BACKGROUND

At present, a reciprocating piston internal combustion engine is commonly characterized in that air suction, compression, combustion and exhaust strokes are completed in the same air cylinder, reciprocating motion of a piston must be changed into rotation of a rotating shaft, and therefore components such as connecting rods, crankshafts and flywheels must be additionally arranged, and the internal combustion engine becomes complex, heavy and low in transmission efficiency.

SUMMARY

The present disclosure aims to provide a cylinder structure of a rotary piston internal combustion engine, the energy utilization rate of the cylinder structure is high, a compression cylinder and a combustion cylinder operate at the same time, components such as connecting rods, crankshafts and flywheels are omitted, and therefore the transmission efficiency of the internal combustion engine is improved.

The technical proposal of the present disclosure is as follows:

A cylinder structure of a rotary piston internal combustion engine comprises a rotating shaft, the two sides of the rotating shaft are installed on machine bases, front deflector rods and rear deflector rods are fixed to the two outer ends of the rotating shaft respectively, the included angles between the front deflector rods and the rear deflector rods are 29 degrees, the front deflector rods at the two outer ends are arranged in the radial direction of the rotating shaft at 180 degrees, and the rear deflector rods at the two outer ends are arranged in the radial direction of the rotating shaft at 180 degrees;

a combustion device and a compression device are sequentially arranged between the two machine bases, the combustion device comprises a rotary drum fixed to the rotating shaft, a piston strip is fixed to the surface of the rotary drum in the axial direction, a combustion cylinder is arranged outside the rotary drum and fixed to the machine bases, a flashboard groove is formed in the top of the combustion cylinder in the axial direction, and a flashboard in clearance fit with the flashboard groove is arranged on the flashboard groove; two spaces are formed by the inner surface and the two inner end faces of the combustion cylinder, the surface of the rotary drum, the two opposite faces of the piston strip and the two opposite faces of the flashboard, the space gradually shrunk in the rotating direction of the rotary drum is an exhaust cavity, and the space gradually enlarged in the rotating direction of the rotary drum is a combustion cavity; an air inlet pipe and an exhaust pipe are connected to the two sides of the flashboard groove of the combustion cylinder respectively, a fuel injector and an electric spark controller are further arranged on the combustion cylinder on one side of the air inlet pipe, the two ends of the exhaust pipe communicate with the atmosphere and the exhaust cavity respectively, the two ends of the air inlet pipe are connected with an air storage tank and the combustion cavity respectively, and an air valve is arranged on the air inlet pipe;

the compression device comprises a rotary drum fixed to the rotating shaft, a piston strip is fixed to the surface of the rotary drum in the axial direction, a compression cylinder is arranged outside the rotary drum and fixed to the machine bases, a flashboard groove is formed in the top of the compression cylinder in the axial direction, and a flashboard in clearance fit with the flashboard groove is arranged on the flashboard groove; two spaces are formed by the inner surface and the two inner end faces of the compression cylinder, the surface of the rotary drum, the two opposite faces of the piston strip and the two opposite faces of the flashboard, the space gradually shrunk in the rotating direction of the rotary drum is a compression cavity, and the space gradually enlarged in the rotating direction of the rotary drum is a negative pressure cavity; an air suction pipe and an air outlet pipe are connected to the two sides of the flashboard groove of the compression cylinder respectively, the two ends of the air suction pipe communicate with the atmosphere and the negative pressure cavity respectively, the two ends of the air outlet pipe are connected with an air storage tank and the compression cavity respectively, and a one-way valve is arranged on the air outlet pipe;

the piston strip on the rotary drum in the compression device and the piston strip on the rotary drum in the combustion device are arranged at an angle of 180 degrees;

each front deflector rod moves forwards by 10 degrees in the rotating direction of the rotary drum in the radial direction where the piston strip on the rotary drum on the same side is located;

Two sets of lever mechanisms are installed on the machine bases on the two sides respectively, each set of lever mechanism comprises a bracket fixed to the corresponding machine base and a lever hinged to the corresponding bracket, the inner end of each lever is hinged to the flashboard on the rotary drum on the same side, an idler wheel is installed at the outer end of each lever, each idler wheel makes instantaneous contact with the front deflector rod rotating on the same side, each front deflector rod rapidly presses down the outer end of the corresponding lever during contact, then each idler wheel makes instantaneous contact with the rear deflector rod rotating on the same side, and each rear deflector rod quickly jacks up the outer end of the corresponding lever during contact, so that each flashboard hinged with the inner end of the corresponding lever vertically moves up and down.

The air valve on the air inlet pipe of the combustion cylinder is controlled by a feeler lever fixed in the radial direction of the rotating shaft, the air valve is opened when the feeler lever is in contact with the air valve, and the air valve is closed when the feeler lever is not in contact with the air valve; and an included angle of 15 degrees is formed between the feeler lever and the radial direction of the piston strip on the rotary drum on the same side, and the piston strip is arranged in front of the feeler lever.

A tension spring is arranged between each lever on the inner side of the corresponding bracket and the corresponding machine base.

One-way valves are arranged on the exhaust pipe and the air suction pipe respectively.

Components such as connecting rods, crankshafts and flywheels are omitted, the structure is simple and convenient, and the weight is reduced. Moreover, the acting stroke (angle) of a gas fuel in the combustion cylinder can reach 240 degrees to the maximum extent, namely two thirds or even three fourths of the whole process, so that the acting stroke of the gas fuel contained in the compression cylinder is 20% higher than that (one fourth) of a four-stroke piston machine. The output power of the cylinder structure is larger than that of a traditional four-stroke piston machine, and the mechanical efficiency of the cylinder structure is about 10% higher than that of the traditional four-stroke piston machine. Moreover, the cylinder structure is stable in operation, lower in noise and low in air pollution, and can completely possibly replace reciprocating piston internal combustion to become a main engine.

In the figures, 1, lever mechanism; 2, combustion device; 3 compression device; 4, machine base; 5, compression cylinder; 6, front deflector rod; 7, rear deflector rod; 8, idler wheel; 9, bracket; 10, lever; 11, tension spring; 12, air suction pipe; 13, flashboard; 14, air outlet pipe; 15, air storage tank; 16, rotating shaft; 17, piston strip; 18, rotary drum; 19, electric spark controller; 20, feeler lever; 21, combustion cylinder; 22, air inlet pipe; 23, exhaust pipe; and 24, fuel injector.

DETAILED DESCRIPTION

Figure 1:
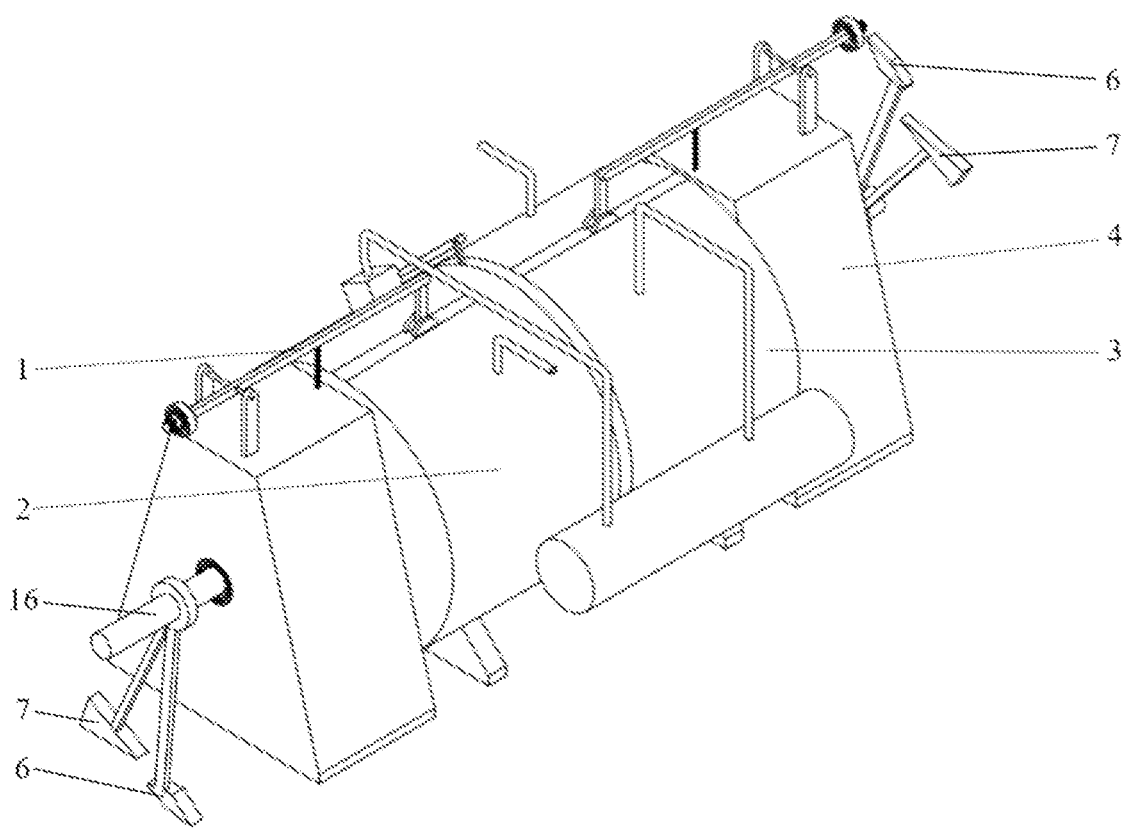
FIG. 1 is a structural schematic diagram of the present disclosure.
Figure 2:
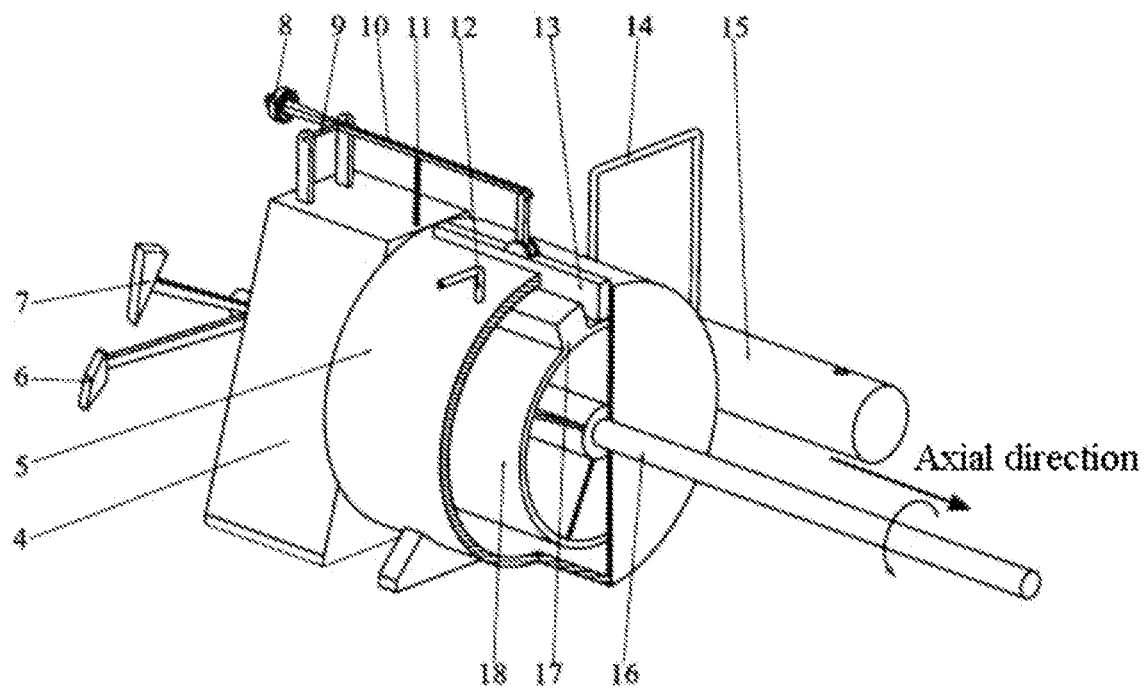
FIG. 2 is a structural schematic diagram of a compression device in the present disclosure.
Figure 3:
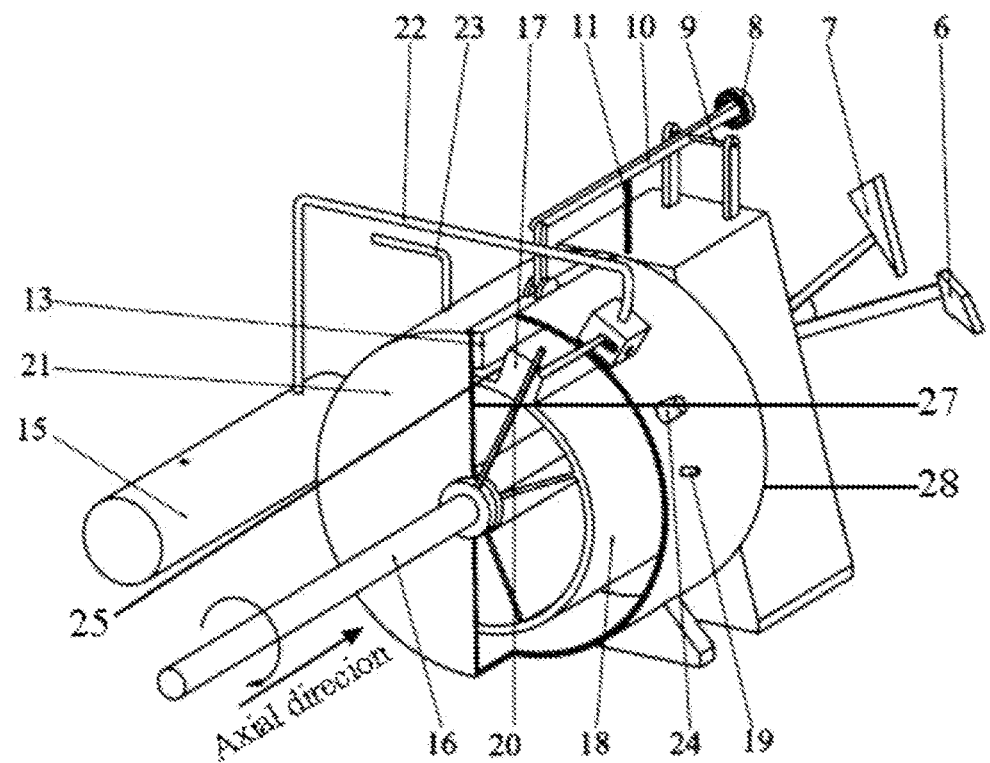
FIG. 3 is a structural schematic diagram of a combustion device in the present disclosure.
Figure 4:
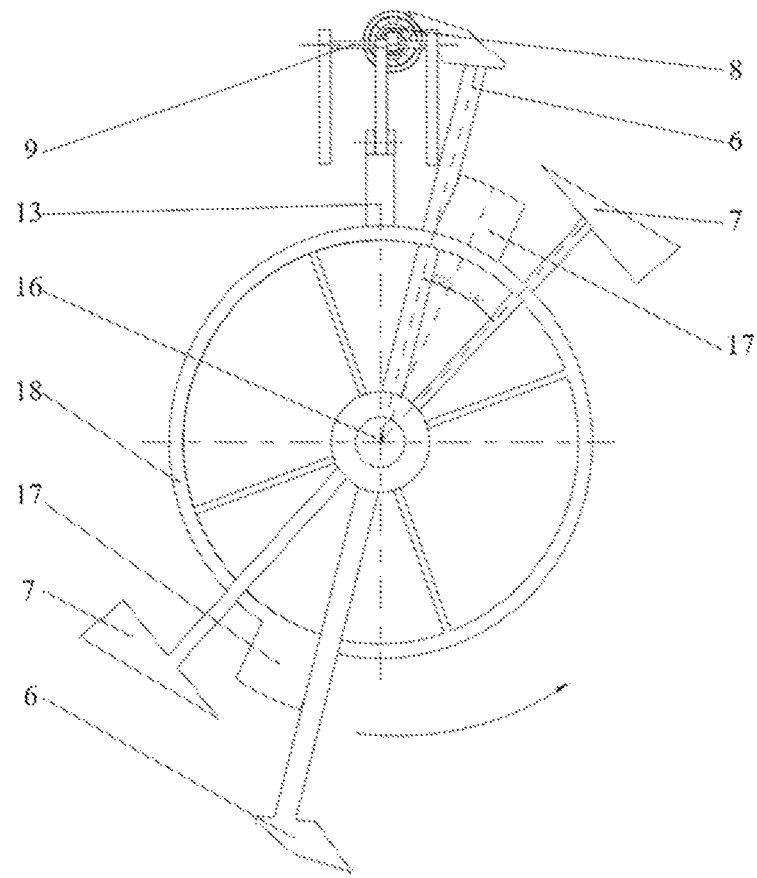
FIG. 4 is a schematic diagram of the position relation between front and rear deflector rods and a piston strip on a rotary drum on the same side in the present disclosure.
Figure 5:
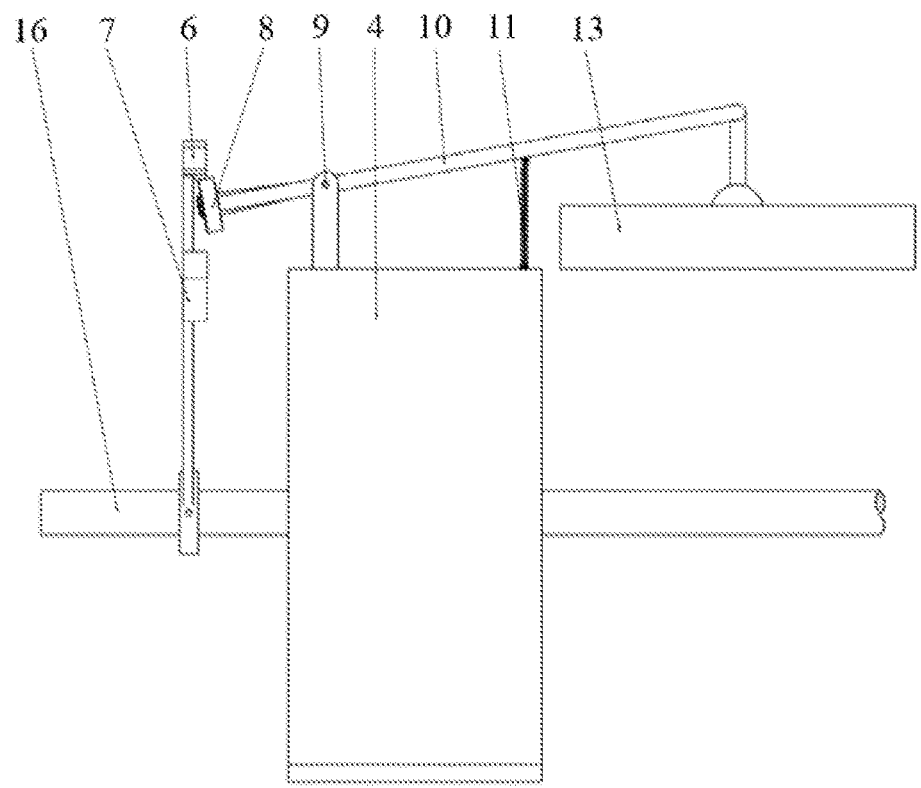
FIG. 5 is a structural schematic diagram of a front deflector rod and an idler wheel on a lever on the same side during instantaneous contact in the present disclosure.
Figure 6:
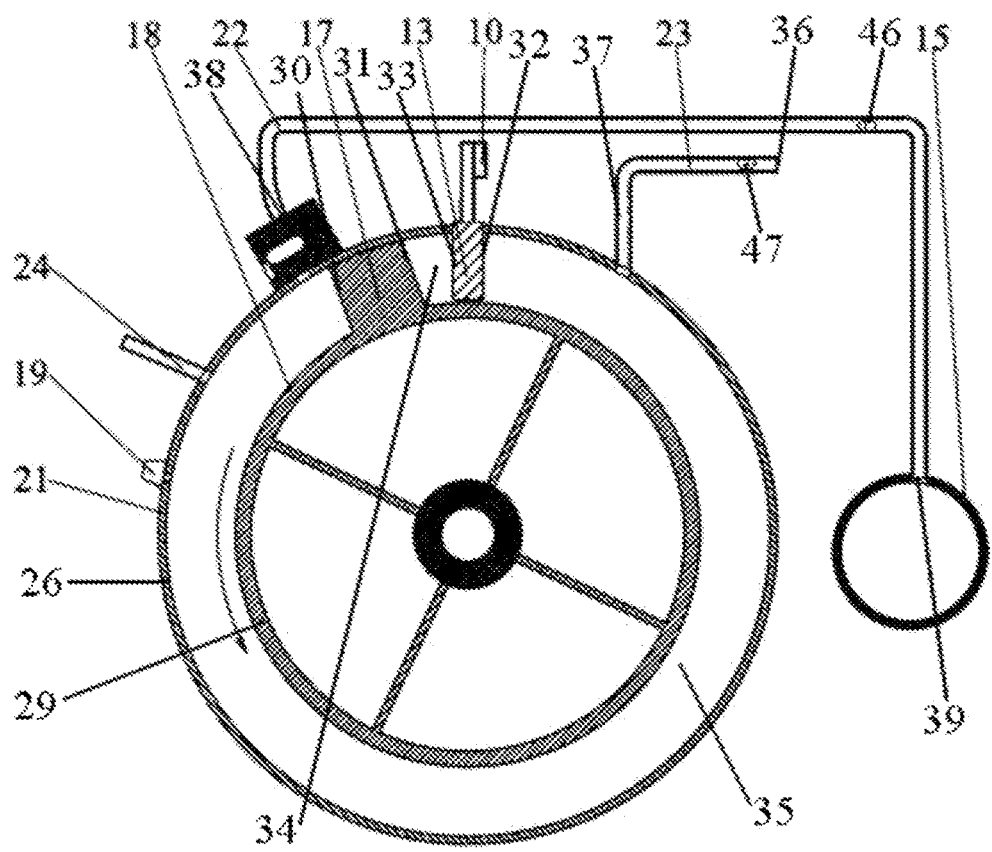
FIG. 6 is a schematic of a combustion device in the present disclosure.
Figure 7:
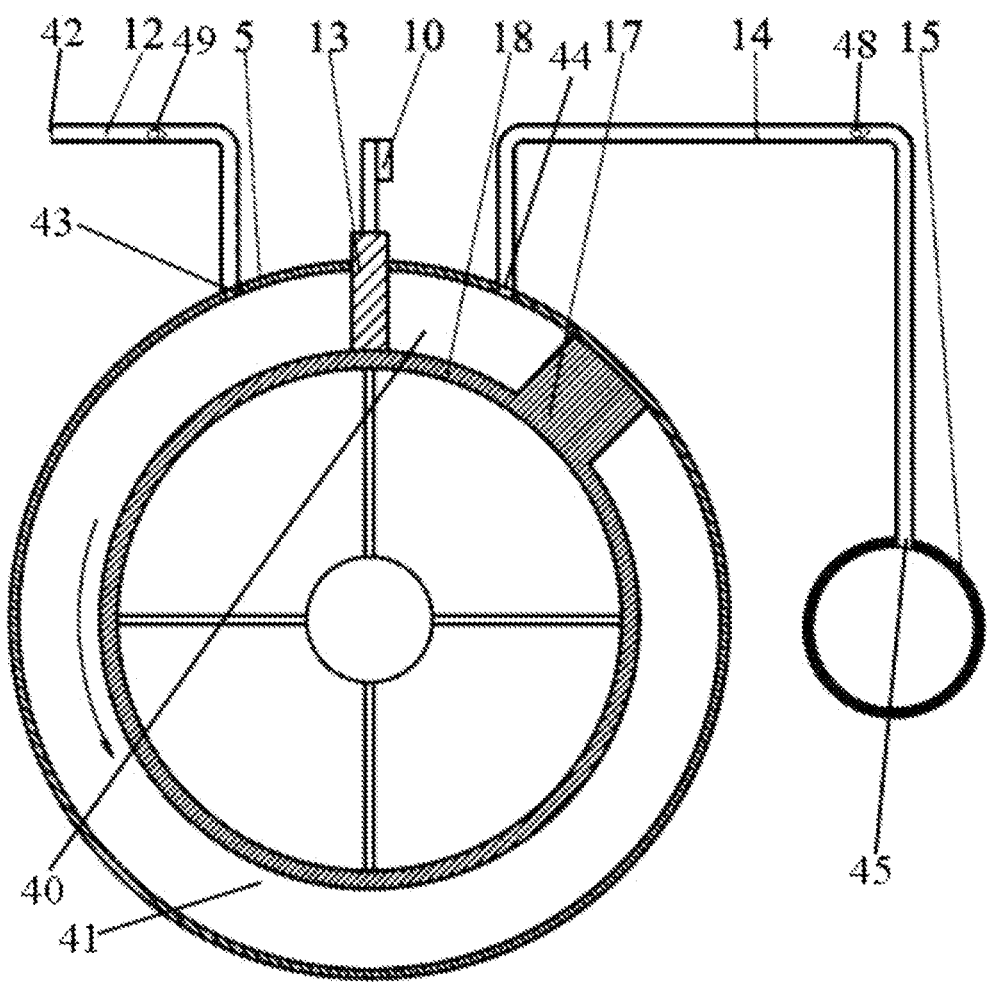
FIG. 7 is a schematic of a compression device in the present disclosure.

As shown in FIG. 1, the device comprises a rotating shaft 16, the two sides of the rotating shaft 16 are installed on machine bases 4, front deflector rods 6 and rear deflector rods 7 are fixed to the two outer ends of the rotating shaft 16 respectively, a combustion device 2 and a compression device 3 are sequentially arranged between the two machine bases 4, and two sets of lever mechanisms 1 are installed on the machine bases 4 on the two sides respectively.

Referring to FIG. 3 to FIG. 6, two spaces formed by an inner surface 26 and two inner end faces 27,28 of the combustion cylinder 21, the surface 29 of the rotary drum, two opposite faces 30,31 of the piston strip and two opposite faces 32,33 of the flashboard. Each of the two spaces gradually shrunk in a rotating direction of the rotary drum is an exhaust cavity 34, and each of the two spaces gradually enlarged in the rotating direction of the rotary drum is a combustion cavity 35. The front deflector rod 6, the rear deflector rod 7 and the feeler lever 20 on the combustion device 2 on the same side are fixed on the rotating shaft 16, and a piston strip 17 in the combustion device 2 is fixed on a rotary drum 18 on the same side. The included angles between the front deflector rods 6 and the rear deflector rods 7 are 29 degrees, and each front deflector rod 6 moves forwards by 10 degrees in the rotating direction of the rotary drum in the radial direction of the piston strip 17 on the rotary drum 18 on the same side; and an included angle of 15 degrees is formed between the feeler lever 20 and the radial direction of the piston strip 17 on the rotary drum 18 on the same side, and the piston strip 17 is arranged in front of the feeler lever 20. Two ends 38,39 of the air inlet pipe are connected with an air storage tank 15 and the combustion cavity 35 respectively. When the air valve 46 on the air inlet pipe 22 in the combustion device 2 is opened, compressed gas in the gas storage tank 15 enters the combustion cavity 35, a fuel injector 24 starts to inject fuel, and after fuel enters the combustion cavity 35, the fuel injector 24 and the air valve on the air inlet pipe 22 are closed, so that a relatively closed space is formed in the combustion cavity 35. At the moment, an electric spark controller 19 ignites, and at the moment when fuel oil in the combustion cavity burns, the pressure intensity of the combustion cavity is larger than that of the exhaust cavity 34, so that the piston strip 17 in the combustion device 2 and the rotary drum 18 of the piston strip 17 are pushed to rotate (gaps between two end faces of rotary drum 18 and two inner end faces 27,28 of combustion cylinder 21 and between two end faces of the piston strip 17 and two inner end faces of the combustion cylinder 21 are 0.3-0.6 mm, and a gap between the top face of piston strip 17 and the inner surface 26 of the combustion cylinder 21 is 0.3-0.45 mm.), and the gas inside the exhaust cavity 34 is exhausted through the exhaust pipe 23. Two ends 36,37 of the exhaust pipe communicate with atmosphere and the exhaust cavity respectively. When the rotating shaft 16 rotates and the front deflector rod 6 makes contact with the idler wheel, the idler wheel 8 can be pressed down, so that the idler wheel 8 rapidly descends to the lowest positions, and according to the lever principle, by using the bracket 9 as a fulcrum, the idler wheel 8 as an outer end point, the lever 10 as a lever shaft and the flashboard 13 as an inner end point, when the idler wheel 8 descends, movement is transmitted through the lever 10; the piston strip 17 on the rotary drum 18 in the combustion device 2 is prevented from colliding with the flashboard 13 in the rotating process, and when the piston strip 17 rotates to the position of the flashboard 13, the front deflector rod 6 is disengaged from the idler wheel 8. When the rotating shaft 16 continues to rotate, due to the fact that the contact portion of the rear deflector rod 7 and the idler wheel 8 is designed to be triangular (of a triangular wedge structure), the idler wheel 8 rises to the highest positions rapidly when the rear deflector rod 7 makes contact with the idler wheel 8, and similarly due to the lever principle, the idler wheel 8 rises, the flashboard 13 falls to the lowest point rapidly, in the lifting process of the flashboard 13 (the gap between the flashboard 13 and the flashboard groove 25 in the top of the combustion cylinder 21 is 0.3-0.45 mm), the tension spring 11 can stabilize the levers 10 and ensure that the flashboard 13 makes contact with the rotary drum 18, air is prevented from overflowing, and the gap between the flashboard 13 and the rotary drum 18 is 0.3-0.45 mm when the flashboard 13 makes contact with the rotary drum 18 at the lowest point. When the rotating shaft 16 continues to rotate to the position where the piston strip 17 is close to the fuel injector 24, the feeler lever 20 makes contact with an air valve switch in the air inlet pipe 22, compressed gas in the gas storage tank 15 enters the combustion cavity, the fuel injector 24 is opened again, and the air valve and the fuel injector 24 in the gas inlet pipe 22 are closed after fuel enters the combustion cavity, so that a relatively closed space is formed; and this is a cyclic process of combustion.

Referring to FIG. 2, FIG. 4, FIG. 5 and FIG. 7, an air suction pipe 12 and an air outlet pipe 14 connected to two sides of the flashboard groove of the compression cylinder respectively, two ends 42,43 of the air suction pipe 12 communicating with atmosphere and the negative pressure cavity 41 respectively, two ends 44,45 of the air outlet pipe 14 are connected with an air storage tank and the compression cavity 40 respectively. In the compression device 3, as the rotating shaft 16 rotates, the compression cavity is gradually reduced, and the negative pressure cavity is gradually increased. Along with the rotation of the rotary drum 18 in the compression device 3, compressed gas in the compression cavity enters the gas storage tank 15 through the one-way valve 48 on the air outlet pipe 14, the one-way valve is opened when the pressure intensity in the compression cavity is higher than that in the gas storage tank 15, and otherwise, the one-way valve is closed. In the gradual reduction process of the compression cavity 40, the negative pressure cavity 41 is gradually increased, the internal air pressure of the negative pressure cavity is lower than the atmospheric pressure, and outside air enters the negative pressure cavity through the air suction pipe 12. The rotating shaft 16 continues to rotate, the front deflector rod and the rear deflector rod on the same side of the compression device 3 rotate along with the rotation of the rotating shaft 16; when the front deflector rod 6 is in contact with the idler wheel 8, the idler wheel 8 is pressed down after the rotating shaft 16 continues to rotate, so that the idler wheel 8 descends to the lowest position rapidly, the flashboard 13 ascends rapidly, and the piston strip 17 is prevented from colliding with the flashboard 13 in the rotating process (the gap between the top surface of the piston strip 17 and the inner surface of the combustion cylinder 21 is 0.3-0.45 mm); and when the piston strip 17 rotates to the position of the flashboard 13, the front deflector rod 6 is disengaged from the idler wheel 8. When the rotating shaft 16 continues to rotate, the rear deflector rod 7 makes contact with the idler wheel 8, so that the idler wheel 8 rises to the highest position rapidly; similarly, due to the lever principle, the idler wheel 8 ascends, the flashboard 13 descends to the lowest point rapidly, and in the lifting process (the gap between the flashboard 13 and the flashboard groove in the top of the compression cylinder 21 is 0.3-0.45 mm), the tension spring 11 can stabilize the lever 10 and ensure that the flashboard 13 makes contact with the rotary drum 18, and air is prevented from overflowing; and this is a cyclic process of compression. The gap between the flashboard 13 and the rotary drum 18 is 0.3-0.45 mm when the flashboard 13 is in contact with the rotary drum 18 at the lowest point, and the gaps between the two end faces of the rotary drum 18 and the two inner end faces of the compression cylinder 5 are 0.3-0.6 mm.

The front deflector rods 6 at two outer ends of the rotating shaft 16 are arranged along the radial direction of the rotating shaft at an angle of 180 degrees, and the rear deflector rods 7 at two outer ends are arranged along the radial direction of the rotating shaft at an angle of 180 degrees; and the piston strip 17 on the rotary drum in the compression device 3 and the piston strip 17 on the rotary drum in the combustion device 2 are arranged at an angle of 180 degrees.

One-way valves 47, 49 are arranged on the exhaust pipe 23 and the air suction pipe 12 respectively.

What is claimed is:

1. A rotary piston internal combustion engine, comprising:
   a rotating shaft; wherein the rotating shaft further comprises two sides of the rotating shaft installed on two machine bases; front deflector rods and rear deflector rods fixed to the two outer ends of the rotating shaft respectively, at an angle of 29 degrees; wherein the front deflector rods at the two outer ends are arranged in a radial direction of the rotating shaft at 180 degrees; and wherein the rear deflector rods at the two outer ends are arranged in the radial direction of the rotating shaft at 180 degrees;
   a combustion device and a compression device sequentially arranged between the two machine bases;
   wherein the combustion device further comprises: a rotary drum fixed to the rotating shaft; a piston strip fixed to a surface of the rotary drum in an axial direction of the rotating shaft; a combustion cylinder arranged outside the rotary drum and fixed to the two machine bases; a flashboard groove formed in a top of the combustion cylinder in the axial direction of the rotating shaft; a flashboard in clearance fitting with the flashboard groove is arranged on the flashboard groove; two spaces formed by an inner surface and two inner end faces of the combustion cylinder, the surface of the rotary drum, two opposite faces of the piston strip and two opposite faces of the flashboard; wherein each of the two spaces gradually shrunk in a rotating direction of the rotary drum is an exhaust cavity; and wherein each of the two spaces gradually enlarged in the rotating direction of the rotary drum is a combustion cavity; an air inlet pipe and an exhaust pipe being connected to two sides of the flashboard groove of the combustion cylinder respectively; wherein two ends of the exhaust pipe communicate with atmosphere and the exhaust cavity, wherein two ends of the air inlet pipe are connected with an air storage tank and the combustion cavity respectively, and wherein an air valve is arranged/positioned in the air inlet pipe; and a fuel injector and an electric spark controller arranged on the combustion cylinder on one side of the air inlet pipe;
   wherein the compression device further comprises: a rotary drum fixed to the rotating shaft; a piston strip fixed to a surface of the rotary drum in the axial direction of the rotating shaft; a compression cylinder arranged outside the rotary drum and fixed to the two machine bases; a flashboard groove formed in the top of the compression cylinder in the axial direction of the rotating shaft; a flashboard in clearance fitting with the flashboard groove is arranged on the flashboard groove; two spaces formed by an inner surface and two inner end faces of the compression cylinder, the surface of the rotary drum, two opposite faces of the piston strip and two opposite faces of the flashboard; wherein each of the two spaces gradually shrunk in the rotating direction of the rotary drum is a compression cavity; and wherein each of the two spaces gradually enlarged in the rotating direction of the rotary drum is a negative pressure cavity; an air suction pipe and an air outlet pipe connected to two sides of the flashboard groove of the compression cylinder respectively; two ends of the air suction pipe communicating with atmosphere and the negative pressure cavity respectively; two ends of the air outlet pipe are connected with an air storage tank and the compression cavity respectively; and a one-way valve is arranged/positioned in the air outlet pipe;

wherein the piston strip of the rotary drum in the compression device and the piston strip of the rotary drum in the combustion device are arranged at an angle of 180 degrees; and wherein each of the front deflector rods moves forwards by 10 degrees in the rotating direction of the rotary drum in the radial direction where the piston strip of the rotary drum on a side of said each of the front deflector rods is located;

two sets of lever mechanisms are installed on the two machine bases on the two sides respectively; wherein each of two sets of the lever mechanisms comprises: a bracket fixed to each of the two machine bases correspondingly and a lever hinged to the bracket; wherein an inner end of the lever is hinged to the flashboard on the rotary drum on the same side, an idler wheel installed at an outer end of the lever; wherein the idler wheel makes instantaneous contact with said each of the front deflector rods rotating on a side of the idler wheel; wherein said each of the front deflector rods rapidly presses down the outer end of the lever during contact correspondingly, wherein the idler wheel makes instantaneous contact with each of the rear deflector rods rotating on a side of the idler wheel; and wherein said each of the rear deflector rods quickly jacks up the outer end of the lever during contact correspondingly, so that the flashboard hinged with the inner end of the lever vertically moves up and down correspondingly.

2. The rotary piston internal combustion engine according to claim 1, wherein the air valve in the air inlet pipe of the combustion cylinder is controlled by a feeler lever fixed in the radial direction of the rotating shaft; and the air valve is opened when the feeler lever is in contact with the air valve; and the air valve is closed when the feeler lever is not in contact with the air valve; and wherein an included angle of 15 degrees is formed between the feeler lever and a radial direction of the piston strip of the rotary drum; wherein the piston strip of the rotary drum is arranged in front of the feeler lever.

3. The rotary piston internal combustion engine according to claim 1, wherein a tension spring is arranged between the lever on the inner side of the bracket and the machine base correspondingly.

4. The rotary piston internal combustion engine according to claim 1, wherein one-way valves are arranged/positioned in the exhaust pipe and the air suction pipe respectively.

* * * * *